(12) United States Patent
Eckersley et al.

(10) Patent No.: US 7,591,334 B2
(45) Date of Patent: Sep. 22, 2009

(54) INDUSTRIAL TRUCK WITH A LATERAL MAINTENANCE OPENING

(75) Inventors: Paul John Eckersley, Hampshire (GB); Nigel Lonsdale Hodgson, Hampshire (GB); Barry Michael Warner, Hampshire (GB)

(73) Assignee: Linde Material Handling GmbH, Aschaffenburg (DE)

( * ) Notice: Subject to any disclaimer, the term of this patent is extended or adjusted under 35 U.S.C. 154(b) by 185 days.

(21) Appl. No.: 11/246,540

(22) Filed: Oct. 7, 2005

(65) Prior Publication Data

US 2006/0076173 A1  Apr. 13, 2006

(30) Foreign Application Priority Data

Oct. 8, 2004  (GB)  ................... 0422436.6

(51) Int. Cl.
*B62D 25/24* (2006.01)
*B60L 9/00* (2006.01)

(52) U.S. Cl. .................... 180/69.24; 180/2.1
(58) Field of Classification Search ............ 180/69.2, 180/69.21, 69.24, 89.17, 2.1
See application file for complete search history.

(56) References Cited

U.S. PATENT DOCUMENTS

| 3,136,435 | A | * | 6/1964 | Vickers ..................... 414/685 |
| 3,583,513 | A | * | 6/1971 | Macadam et al. ......... 180/69.24 |
| 3,645,349 | A | * | 2/1972 | Nichter ..................... 180/6.48 |
| 3,708,028 | A | * | 1/1973 | Hafer ....................... 180/65.1 |
| 4,616,872 | A | * | 10/1986 | Akira et al. ............ 296/190.11 |
| 4,828,943 | A | * | 5/1989 | Pritchard .................... 429/91 |
| 5,040,628 | A | * | 8/1991 | Price ........................ 180/69.21 |
| 5,504,655 | A | * | 4/1996 | Underwood et al. ........ 361/707 |
| 5,562,538 | A | * | 10/1996 | Suyama ........................ 454/75 |
| 5,627,448 | A | * | 5/1997 | Okada et al. ................ 439/133 |
| 5,634,525 | A | * | 6/1997 | Templeton et al. ....... 180/69.24 |
| 5,773,957 | A | * | 6/1998 | Imaseki ...................... 320/116 |
| 5,952,813 | A | * | 9/1999 | Ochiai ........................ 320/104 |
| 6,068,339 | A | * | 5/2000 | Linzalone ................ 297/463.1 |
| 6,135,223 | A | * | 10/2000 | Miyachi et al. .......... 180/69.21 |
| 6,253,138 | B1 | * | 6/2001 | Shober et al. ................. 701/51 |
| 6,256,909 | B1 | * | 7/2001 | Kost et al. .................... 37/231 |
| 6,660,967 | B2 | | 12/2003 | Brofft et al. |
| 2004/0142232 | A1 | * | 7/2004 | Risca et al. ................. 429/100 |

FOREIGN PATENT DOCUMENTS

| JP | 2000-054429 A | 2/2000 |
| JP | 2002-167800 A | 6/2002 |
| JP | 2004-217164 A | 8/2004 |
| WO | 03/021094 A1 | 3/2003 |

* cited by examiner

*Primary Examiner*—Frank B Vanaman
(74) *Attorney, Agent, or Firm*—The Webb Law Firm

(57) ABSTRACT

An industrial truck, in particular a reach truck or reach-fork truck, has a maintenance opening. At least the following components are accessible through the same maintenance opening: at least one electric connector (10, 16, 17), a hydraulic tank (4) for level monitoring and/or for topping up hydraulic fluid, and electrical fuses (9). Furthermore, a brake fluid container (7) can be accessible through the maintenance opening for level monitoring and/or for topping up brake fluid, as can a hydraulic oil filter (5). The maintenance opening can be closed with a door, preferably with a folding door (1).

13 Claims, 4 Drawing Sheets

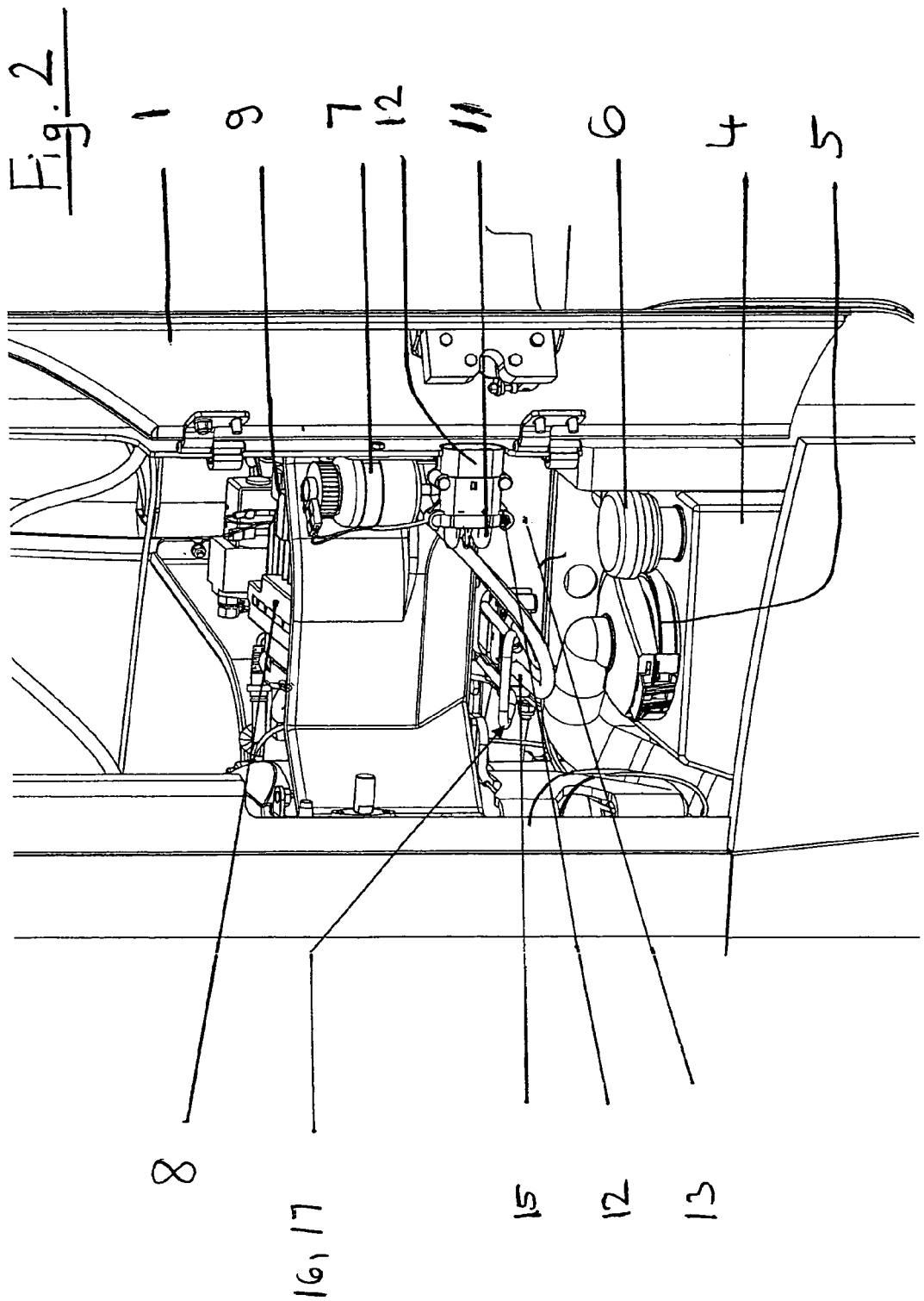

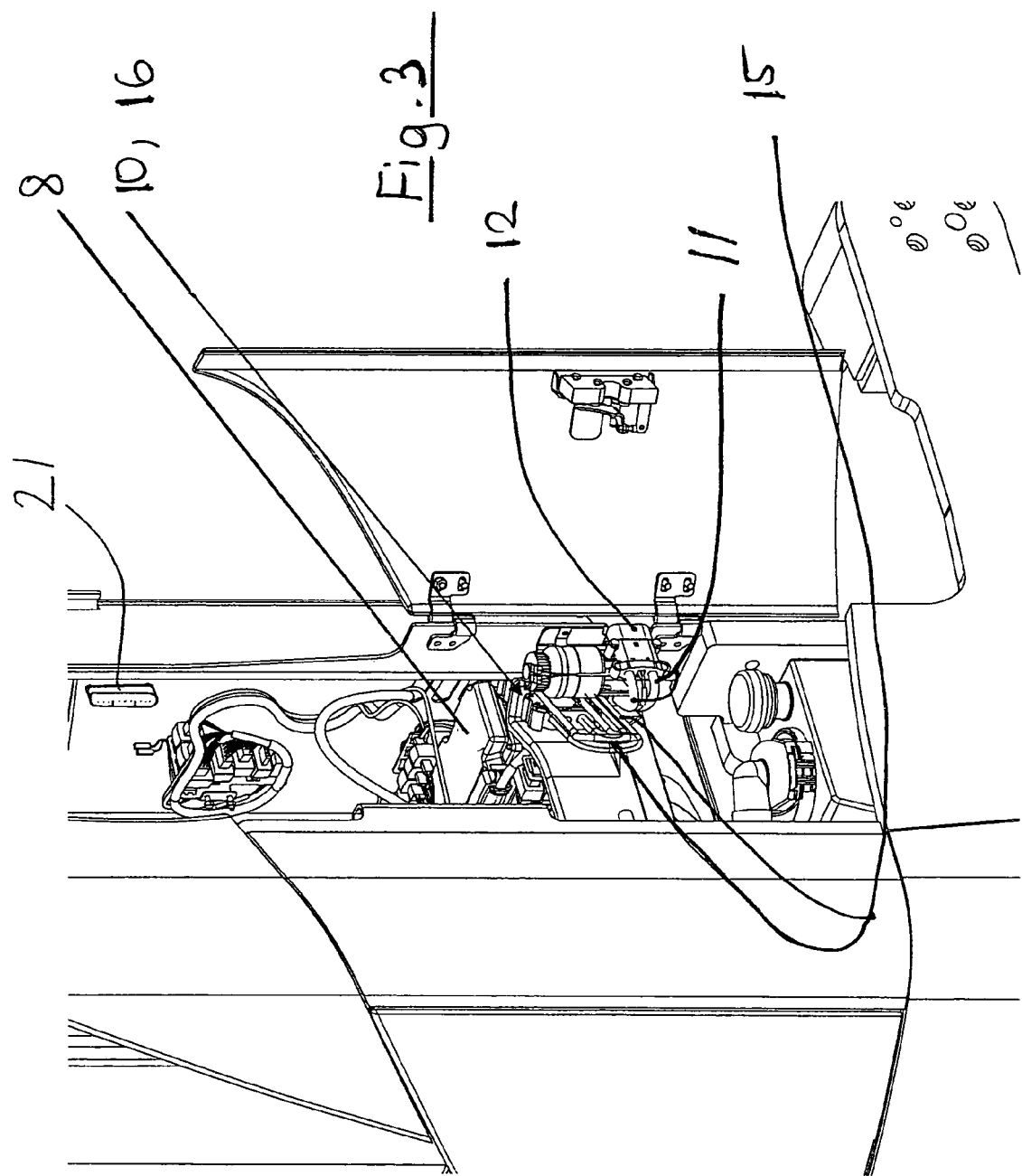

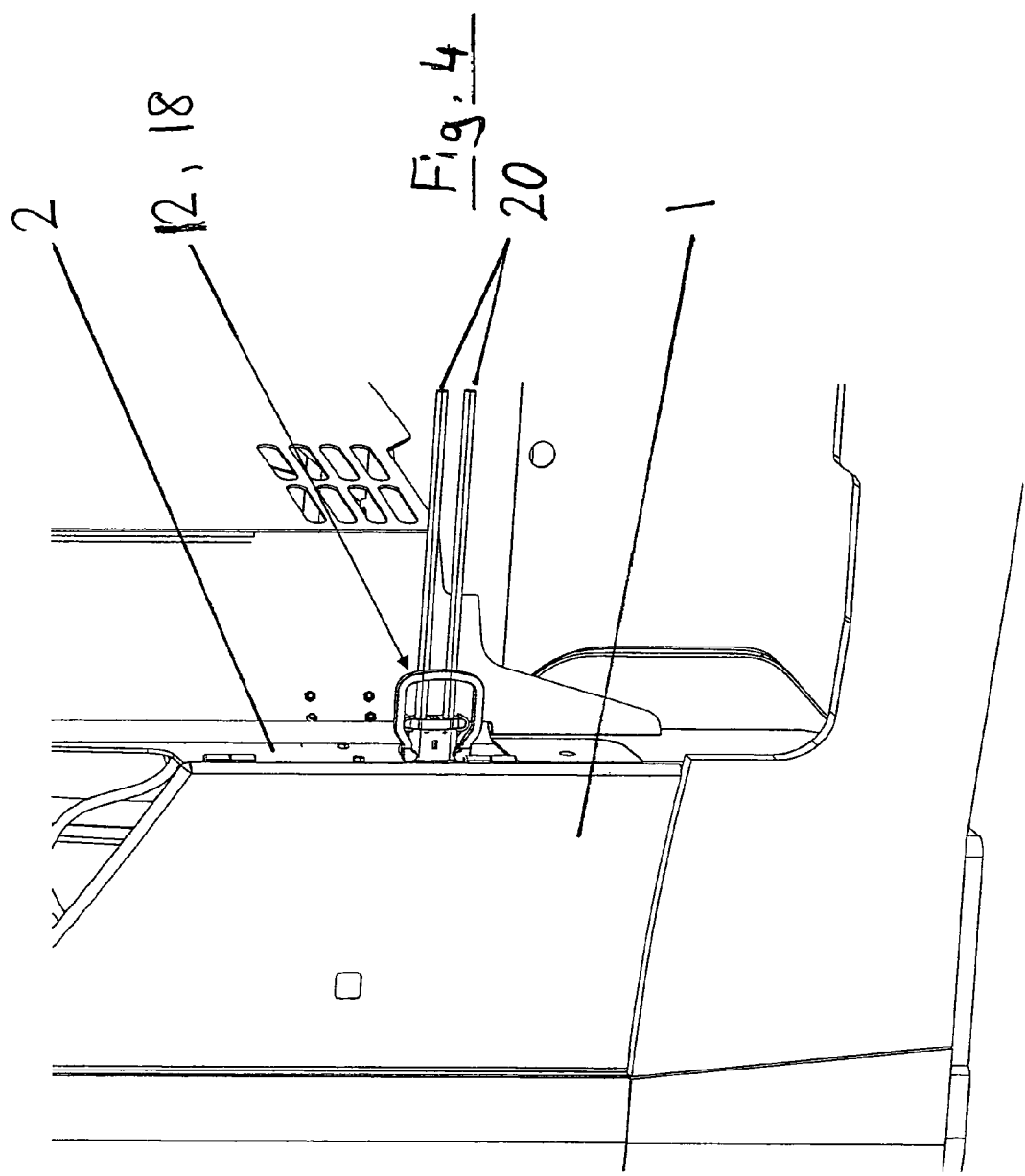

INDUSTRIAL TRUCK WITH A LATERAL MAINTENANCE OPENING

CROSS-REFERENCE TO RELATED APPLICATION

This application claims priority to British Application No. 0 422 436.6 filed Oct. 8, 2004, which is herein incorporated by reference in its entirety.

BACKGROUND OF THE INVENTION

1. Field of the Invention

The invention relates to an industrial truck, in particular a reach truck, with a lateral maintenance opening.

2. Technical Considerations

Industrial trucks are produced in various designs, for example as counterweight fork-lift trucks, reach trucks, reach-fork trucks, driver's platform trucks or pedestrian controlled trucks. A large number of assemblies and drive components of the various functions of the industrial truck are arranged in a drive part of the industrial truck. These include, for example, an electric traction drive motor, a brake fluid container, an electrically-driven hydraulic pump, a power electronics unit, electrical fuses, a hydraulic tank, a hydraulic oil filter, a battery block and electric connectors, in particular for connecting the battery block to the power electronics unit.

Many of these aforementioned parts must be accessible for regular inspection and maintenance work. For example, an external battery charging device can be plugged in at the electric connector in order to charge the battery block. During the replacement of the battery block, an external voltage source can be plugged into the truck-side connector, in particular in order to be able to supply the traction drive with power independently of the battery block. The level in the hydraulic tank must be checked regularly and must be topped up as required. The same is true of the brake fluid container. Likewise, the level of the battery acid in the battery block must be monitored regularly and equalized with distilled water as required. The electrical fuses of the industrial truck must be accessible simply in order to be able to actuate or replace them as required. The hydraulic oil filter must likewise be accessible simply, since this must be changed or cleaned at regular intervals.

In the industrial trucks of the known art, the aforementioned components of the industrial truck, to which regular access is necessary for maintenance and inspection work, are frequently arranged at different points in the industrial truck and are thus not centrally accessible. For this reason, known industrial trucks from the known art have a large number of maintenance accesses, through which the above-described inspection and maintenance work can be carried out. This applies, in particular, to reach trucks and reach-fork trucks, in which the various assemblies and drive components are normally distributed to installation locations underneath the driver's platform, underneath the operating panel and on the load side of the driver's platform. As a result of the necessary opening and closing of a plurality of maintenance openings, carrying out the regular inspection and maintenance work is complicated and time-consuming.

The present invention is, therefore, based on the object of simplifying the performance of the regular inspection and maintenance work.

SUMMARY OF THE INVENTION

According to the invention, this object is achieved in that at least the following components are accessible through the same maintenance opening: at least one electric connector, a hydraulic tank for level monitoring and/or for topping up hydraulic fluid, and also electrical fuses. One of the electric connectors connects the battery block of the industrial truck to the power electronics unit which, in particular, drives the traction drive and the lifting drive. This plug connection has to be released in order to change or to charge the battery block. The level of the hydraulic tank should be inspected daily, it being possible for either a dipstick or a transparent container to be provided for level monitoring. If required, hydraulic oil can be topped up through a filling opening, which is likewise accessible through the maintenance opening. The electrical fuses, which are likewise accessible through the same maintenance opening, are checked in the course of maintenance work and renewed as required. The arrangement according to the invention of the relevant components behind a common maintenance opening permits simple and time-saving maintenance and overhaul of the industrial truck.

Further advantages result if a brake fluid container is accessible through the maintenance opening for level monitoring and/or for topping up brake fluid. The brake fluid container of a hydraulic braking system is thus likewise accessible through the same maintenance opening, the brake fluid container, which is transparent as a rule, permitting visual level monitoring.

It is also expedient if a hydraulic oil filter is accessible through the maintenance opening. The hydraulic oil filter, which is used to filter contaminants out of the hydraulic oil, should be cleaned or replaced regularly. According to the invention, the hydraulic oil filter is also accessible through the maintenance opening in order to carry out this work.

The battery acid level in the battery block can be checked particularly simply if an indicator for a battery acid level, with which the level can be monitored, is accessible through the maintenance opening. It is likewise possible to provide a filling opening which is accessible through the maintenance opening and through which distilled water can be topped up in the battery block.

The maintenance opening can be closed with a door, preferably with a folding door. The folding door is mounted on one side of the maintenance opening by means of hinges and can be pivoted open completely. In the closed state, the door prevents undesired access to the components that can be reached through the maintenance opening, and protects the latter against damage.

An electric connector which is accessible through the maintenance opening is expediently arranged on a battery block located in the industrial truck. The connector arranged on the battery block is formed by a socket. When the maintenance opening is opened, a battery charging device located outside the industrial truck can be plugged into this socket.

A further electric connector which is accessible through the maintenance opening is connected to a power electronics unit of the industrial truck. This connector, designed as a plug, is connected to the power electronics unit via a cable. During the operation of the industrial truck, this plug is connected to the socket on the battery block, so that the battery block can supply the power electronics unit with electrical energy.

The operation of the industrial truck with an external voltage source is made possible if an electric connector which is accessible through the maintenance opening is arranged on a connecting cable for connecting the industrial truck to an external voltage source. This connector is designed as a socket. The plug connected to the power electronics unit can be plugged into this socket. The power electronics unit is then connected to the connecting cable.

It is particularly expedient in this case if the connecting cable is connected to a further connector which is accessible when the maintenance opening is closed. A cable belonging to an external voltage source can be plugged into this plug. Therefore, with the maintenance opening closed, the industrial truck is supplied with power from the external voltage source. This function is used in order to be able to drive the industrial truck away from a discharged battery block to a freshly charged battery block with its own drive during a battery change.

BRIEF DESCRIPTION OF THE DRAWINGS

Further advantages and details of the invention will be explained in more detail by using the exemplary embodiment illustrated in the schematic figures, in which like reference numbers identify like parts throughout.

FIGS. 1-3 show an opened maintenance opening of an industrial truck according to the invention: in particular, FIG. 1 shows a perspective view of an opened maintenance opening; FIG. 2 shows a detailed perspective view of an opened maintenance opening; and FIG. 3 shows a detailed perspective view of an opened maintenance opening and a connector; and FIG. 4 shows a closed maintenance opening of an industrial truck according to the invention.

DESCRIPTION OF THE PREFERRED EMBODIMENTS

Figure 1:
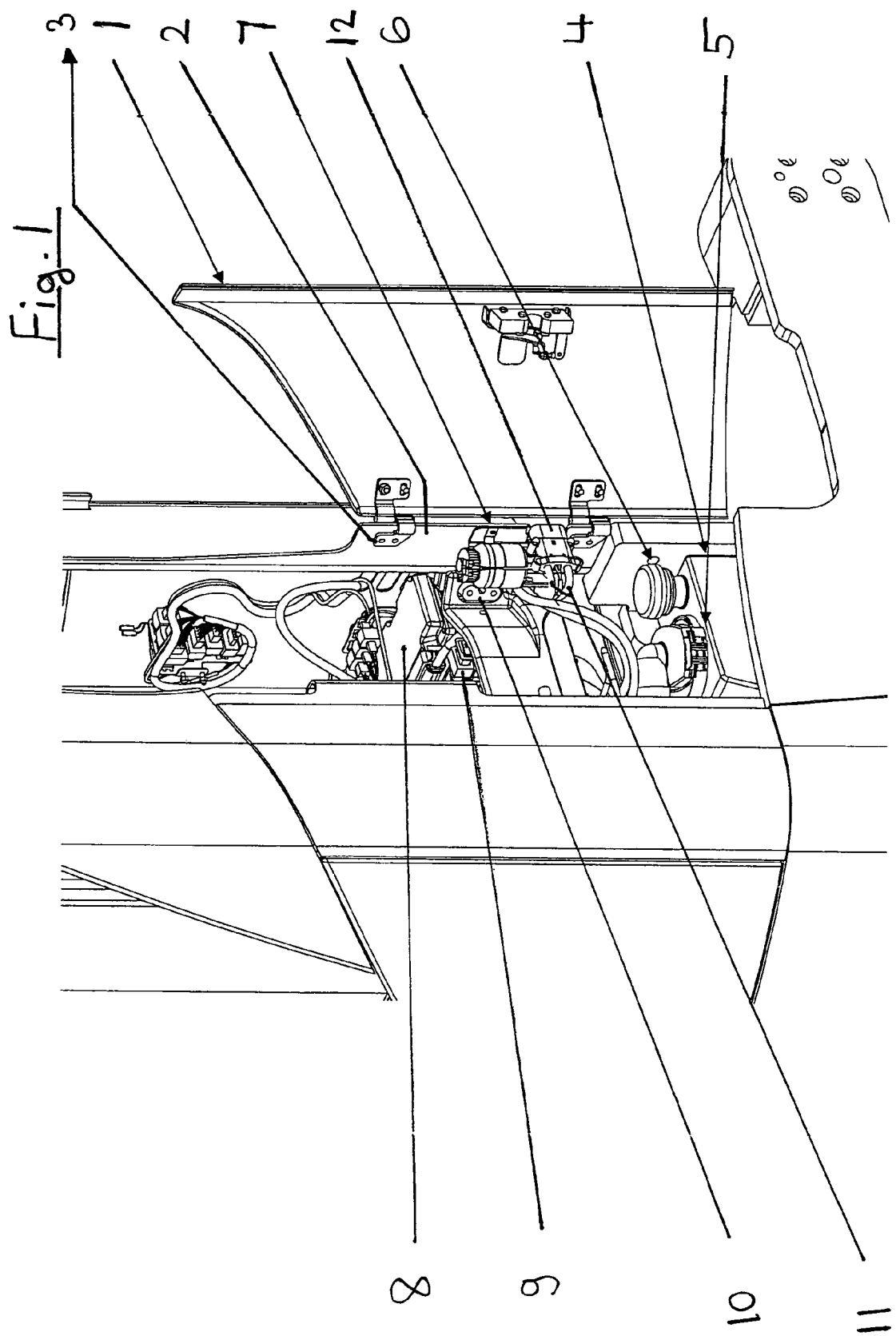

FIG. 1 shows an opened maintenance opening of an industrial truck according to the invention. The maintenance opening is located on a side surface of the bodywork of the industrial truck. It is possible to see an opened folding door 1, which is mounted on a bodywork component 2 of the industrial truck by means of hinges 3. The following components are accessible in the maintenance opening: a hydraulic tank 4 designed from transparent plastic, on which a hydraulic oil filter 5 and a top-up opening 6 for hydraulic oil are arranged, a brake fluid container 7 having a filling opening, a power electronics unit 8, electrical fuses 9, and/or a battery acid level indicator 21 (FIG. 3).

It is also possible to see an electric connector 10 formed by a socket, which is connected via a cable 11 to a further connector 12 formed by a plug. The connectors 10 and 12 and the cable 11 are used for the auxiliary power supply of the industrial truck by means of an external voltage source.

In FIG. 2, the maintenance opening is illustrated in another view, in which part of a battery block 13 is visible. The battery block 13 is connected by means of a cable 15 to the power electronics unit 8, there being arranged at the battery-side end of the cable 15 a connector 16 which is formed by a plug and which is plugged into a connector 17 arranged on the battery block 13 and formed by a socket.

FIG. 3 shows a view of the maintenance opening according to FIG. 1 with an arrangement of the connector for the operation of the industrial truck with an external voltage source. For this purpose, the connector (plug) 16 is plugged into the connector (socket) 10, so that the power electronics unit 8 is connected via the cable 15, the connectors 16 and 10 and the cable 11 to the connector (plug) 12.

The closed maintenance opening of the industrial truck according to the invention is illustrated in FIG. 4, the folding door 1 being closed. In this view, it is possible to see how a cable 20 coming from an external voltage source, not illustrated, is plugged onto the connector (plug) 12 by means of a connector 18 fixed thereto and designed as a socket. The connector 12 arranged on the industrial truck is positioned in such a way that it is accessible when the folding door 1 is closed. The folding door 1 and the connector 12 can also be arranged in such a way that it is possible to plug in an external voltage source only when the folding door 1 is closed. In this way, it is then ensured that the folding door 1 is closed at all times during the operation of the industrial truck on an external voltage source.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. An industrial truck, comprising:
   a lateral maintenance opening located on a single side surface of bodywork of the industrial truck, wherein at least the following components are accessible through the same maintenance opening:
   at least three electric connectors;
   a hydraulic tank for level monitoring and/or for topping up hydraulic fluid; and
   electrical fuses,
   wherein the lateral maintenance opening is closed with a single door hingedly movable about a substantially vertical axis,
   wherein a first electric connector, which is accessible through the lateral maintenance opening, is arranged on a battery block located in the industrial truck and connects the battery block to a power electronics unit that drives a traction drive and a lifting drive,
   wherein a second electric connector, which is accessible through the maintenance opening, is connected to the power electronics unit of the industrial truck,
   wherein a third electric connector, which is accessible through the maintenance opening, is arranged to connect the industrial truck to an external voltage source, and
   wherein the third electric connector is connected to a fourth electric connector, the fourth electric connector being arranged with respect to the lateral maintenance opening and the door such that the fourth electric connector is accessible when the door is closed and inaccessible when the door is open and the fourth electric connector being adapted to connect to an external voltage source via a fifth electric connector when the door is closed.

2. The industrial truck according to claim 1, including a brake fluid container that is accessible through the maintenance opening for level monitoring and/or for topping up brake fluid.

3. The industrial truck according to claim 2, including a hydraulic oil filter that is accessible through the maintenance opening.

4. The industrial truck according to claim 2, including an indicator for a battery acid level that is accessible through the maintenance opening for level monitoring.

5. The industrial truck according to claim 2, wherein the third electric connector is arranged on a connecting cable in order to connect the industrial truck to an external voltage source.

6. The industrial truck according to claim 1, including a hydraulic oil filter that is accessible through the maintenance opening.

7. The industrial truck according to claim 6, including an indicator for a battery acid level that is accessible through the maintenance opening for level monitoring.

8. The industrial truck according to claim 6, wherein the third electric connector is arranged on a connecting cable in order to connect the industrial truck to an external voltage source.

9. The industrial truck according to claim 1, including an indicator for a battery acid level that is accessible through the maintenance opening for level monitoring.

10. The industrial truck according to claim 1, wherein the third electric connector is arranged on a connecting cable in order to connect the industrial truck to an external voltage source.

11. The industrial truck according to claim 10, wherein the connecting cable is connected to the fourth electric connector.

12. The industrial truck according to claim 1, wherein the fourth electric connector is positioned adjacent to the substantially vertical axis about which the single door is hingedly movable.

13. The industrial truck according to claim 1, wherein the fourth electric connector is a plug adapted to connect to an electric socket, the fourth electric connector being accessible from an exterior of the industrial truck when the door is closed.

\* \* \* \* \*